US007715888B2

(12) United States Patent
Ko

(10) Patent No.: US 7,715,888 B2
(45) Date of Patent: May 11, 2010

(54) DECORATIVE WIRELESS EARPHONE DEVICE

(75) Inventor: Li-Li Ko, Sindian (TW)

(73) Assignee: Micro-Star Intl Co., Ltd., Jhonghe, Taipei County (TW)

( * ) Notice: Subject to any disclaimer, the term of this patent is extended or adjusted under 35 U.S.C. 154(b) by 631 days.

(21) Appl. No.: 11/730,028

(22) Filed: Mar. 29, 2007

(65) Prior Publication Data

US 2008/0161023 A1 Jul. 3, 2008

(30) Foreign Application Priority Data

Dec. 28, 2006 (TW) .............................. 95222993 U

(51) Int. Cl.
*H04M 1/00* (2006.01)

(52) U.S. Cl. ................................. 455/575.2; 455/569.1

(58) Field of Classification Search ............. 455/575.1, 455/575.2

See application file for complete search history.

(56) References Cited

U.S. PATENT DOCUMENTS

2007/0036370 A1* 2/2007 Granovetter et al. ......... 381/311
2007/0160252 A1* 7/2007 Wang et al. ................. 381/378

* cited by examiner

*Primary Examiner*—Tu X Nguyen

(57) ABSTRACT

A decorative wireless earphone is a single piece integrated with a necklace, a microphone, a main unit and an earpiece. The main unit has a shape of pendant and the earplug is hidden behind the ornamental part. The lead wire is received in the necklace. The distance between the microphone and the earpiece is almost equal to the distance between the mouth and the ear of human. Due to the wireless earphone being designed as an ornament, it could be worn on the neck naturally and reasonably with less chance of being lost, convenience and easy-storage. Hence, the decorative wireless earphone of the present invention has enhanced the value thereof additionally and has promoted competition thereof in the market.

18 Claims, 5 Drawing Sheets

DECORATIVE WIRELESS EARPHONE DEVICE

BACKGROUND OF THE INVENTION

1. Field of the Invention

The present invention is related to a wireless earphone device and particularly to an earplug type combining wire-hanging type Bluetooth earphone.

2. Brief Description of Related Art

Currently, there are four types Bluetooth earphones available on the market: ear-hanging type, earplug type, earplug combining ear-hanging type and wire-hanging type. The preceding four types have their advantages and disadvantages depending on factors, such as power consumption, price, portability, comfort, storage at the time of on-duty, storage and affect to the glasses worn by the user. The user usually selects one of the preceding types according to his/her personal need.

The preceding Bluetooth earphone are belonged to cold technological products with regard to shape and function and their designs are much more favorable for male users rather than for female users.

Taiwan Utility Model No. M268827 discloses a necklace with wireless receiver. Taiwan Patent Publication No. 540950 discloses an improved wireless earphone. Taiwan Patent Publication No. 516762 discloses a hanging type held-free receiver.

The preceding prior art provides an ear receiver and a coil or necklace hanging on the neck. The receiver is separated from the coil or necklace distinctly and structure of the earphone exposes clearly. A single piece integrated with both the receiver and the necklace in association with ornamental design is not found in the prior art.

SUMMARY OF THE INVENTION

The crux of the present invention is in that the wireless earphone device is associated with ornamental design in addition to being used and carried easily.

The primary object of the present invention is to provide a decorative wireless earphone device, which is an ornamental article associated with a wireless earphone.

Another object of the present invention is to provide a decorative wireless earphone device with which the microphone is capable of approaching the mouth of the user automatically once the earplug is inserted into his ear such that better sound receipt can be obtained along with convenient operation.

A further object of the present invention is to provide a decorative wireless earphone device, which is capable of enhancing the value of the wireless earphone additionally and promoting competition of the product.

Accordingly, a decorative wireless earphone device according to the present invention includes:

a necklace;

a microphone being joined to the necklace for an user to output voice signal;

a main unit being joined to the necklace for receiving/sending radio signal and further comprising: an ornamental part, which provides a first surface and a second surface, and a earplug, which extends outward from the outer side of the second surface;

an earpiece being joined to the main unit and disposed in the earplug; and a lead wire being arranged in the necklace, an end thereof being connected to the main unit electrically and another end thereof being connected to microphone electrically;

wherein a distance between the microphone and the earpiece is almost equal to a distance between the mouth and the ear of human and the earplug hides behind the first surface such that the wireless earphone is associated with ornamental function and it could be worn on the neck naturally and reasonably with less chance of being lost, much convenience and easy storage for enhancing the value of wireless earphone additionally and promoting competition of product.

BRIEF DESCRIPTION OF THE DRAWINGS

The present invention can be more fully understood by reference to the following description and accompanying drawings, in which.

DETAILED DESCRIPTION OF THE INVENTION

Figure 1:
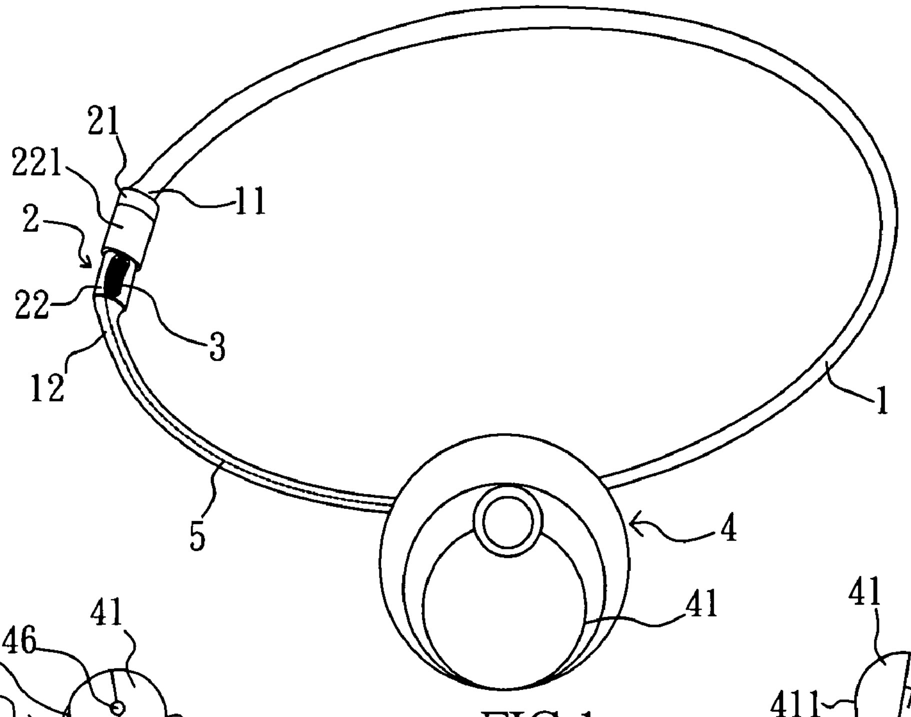
FIG. 1 is a perspective view of the first embodiment of a decorative wireless earphone device according to the present invention.
Figure 2:
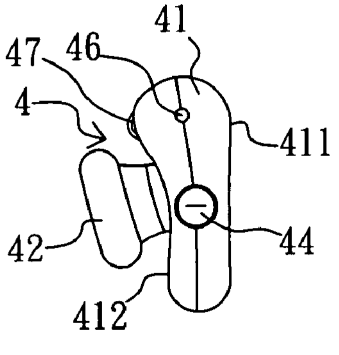
FIG. 2 is a left side view of the first embodiment of a decorative wireless earphone device according to the present invention.
Figure 3:
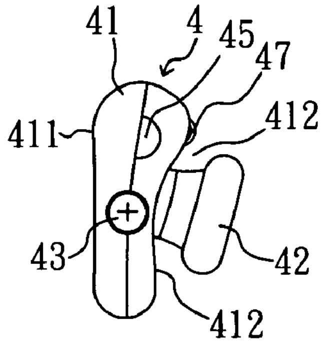
FIG. 3 is a right side view of the first embodiment of a decorative wireless earphone device according to the present invention.
Figure 4:
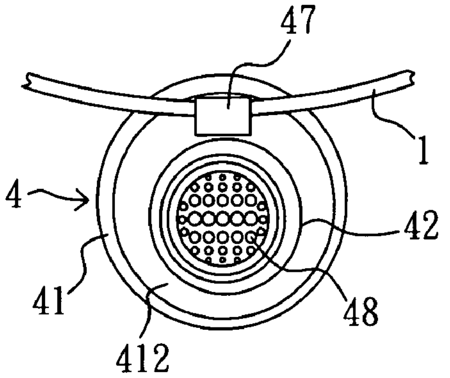
FIG. 4 is a rear view of the first embodiment of a decorative wireless earphone device according to the present invention.

Referring to FIGS. 1, 2, 3 and 4, a decorative wireless earphone device according to the present invention is a wireless earphone with function of decoration and the first embodiment thereof includes:

a necklace 1, which is made of leather string, with a first end 11 and a second end 12;

a joining set 2, which further includes a first joining member 21 attached to the first end 11 of the necklace 1 and a second joining member 22 attached to the second end of the necklace 1 for the necklace 1 being capable of being hung on the neck of the user while the first joining member 21 engaging with the second member 22;

a microphone 3, which is joined to the second joining member 22 for voice signal being output by the user;

a main unit 4, which is employed to send/receive wireless signal, such as Bluetooth wireless signal and further includes an ornamental part 41, an earplug 42, volume control keys 43, 44, a switch key 45 and an indicating light 46, wherein the ornamental part 41 has a first surface 411 and a second surface 412 and the first surface 411 is made of jewelry material with design similar to a pendant; the earplug 42 extends outward from the second surface 412 and hides behind the decorative part 41 so that the earplug is invisible from the front side of the first surface 411; the indicating light 46 is lighted up if the main unit 4 is in a state of "On"; and the second surface 412 has a third joining member 47 for being joined to the necklace 1;

an ear receiver 48, which is associated with the main unit 4 to be disposed at the inner side of the earplug 42; and a lead wire 5, which is disposed in the necklace and electrically connected to the microphone 3 and the main unit 4 with two ends thereof respectively;

wherein the distance between the microphone 3 and the ear receiver 48 is about the distance between the mouth and the ear of the user.

Figure 5:
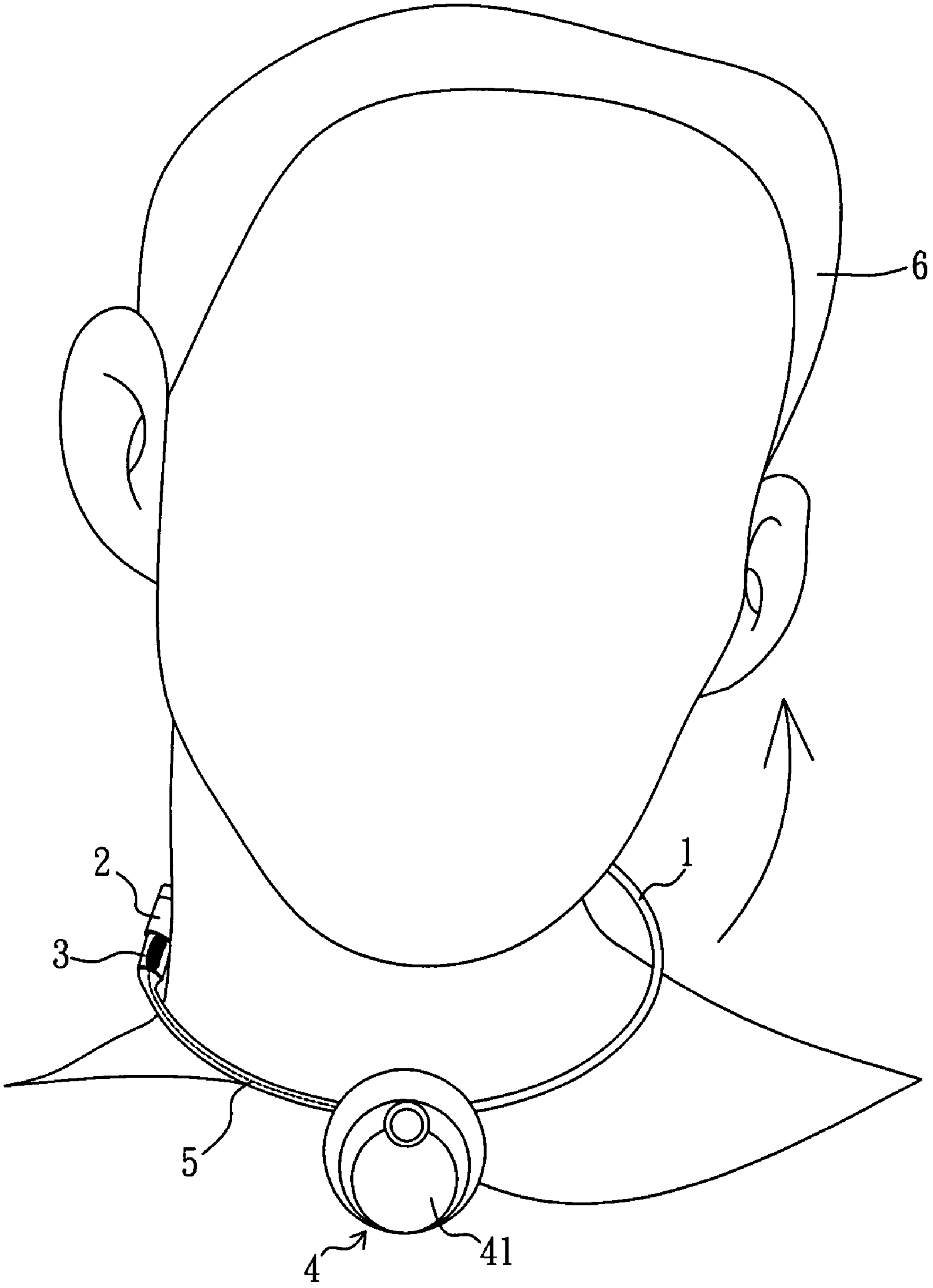
FIG. 5 is a perspective view illustrating the user wearing the first embodiment of a decorative wireless earphone device according to the present invention.
Figure 6:
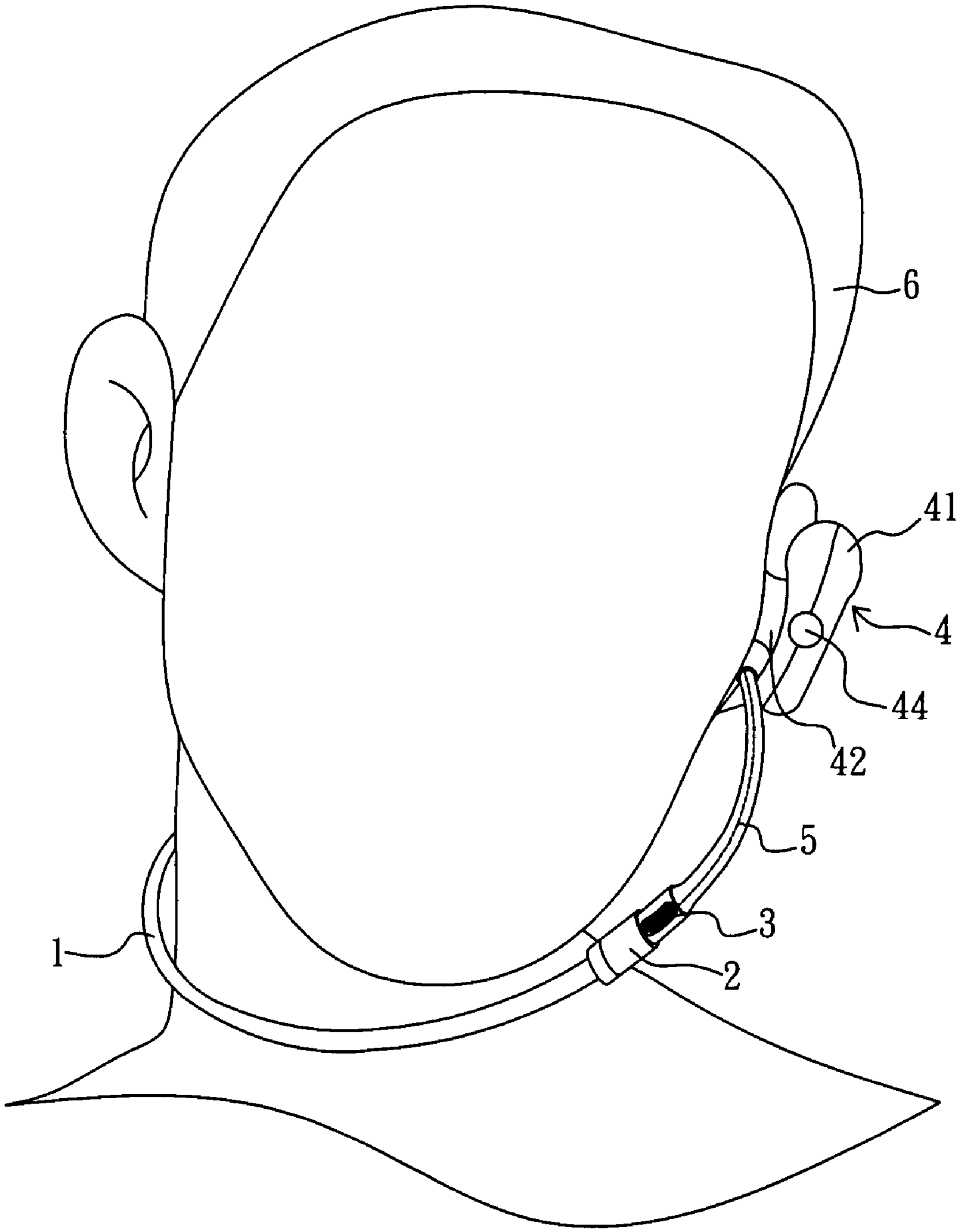
FIG. 6 is a perspective view illustrating the user using the first embodiment of a decorative wireless earphone device according to the present invention.

Referring to FIGS. 5 and 6, the first embodiment of the wireless earphone device of the present invention can be implemented such as a blue tooth earphone in which the necklace 1, the microphone 3, the main unit 4 and the ear receiver 48 are integrated as a single piece with design of decoration. The main unit 4 provides an appearance like an earring and the earplug 42 hides behind the ornamental part 41 while not in use. The lead wire 5 is invisible in the necklace 1 as shown in FIG. 5. The user 6 wearing the wireless earphone looks like wearing a necklace with an earring without a cold feeling of wearing a technological product, the Bluetooth earphone. When the wireless earphone is in use, the only thing has to be done is to insert the earplug 42 into the auditory canal of the ear and the microphone 3 is capable of approaching the mouth simultaneously as shown in FIG. 6. Hence, the user 6 is capable of listening to voice with the ear receiver 48 and sending out vocal message.

Figure 7:
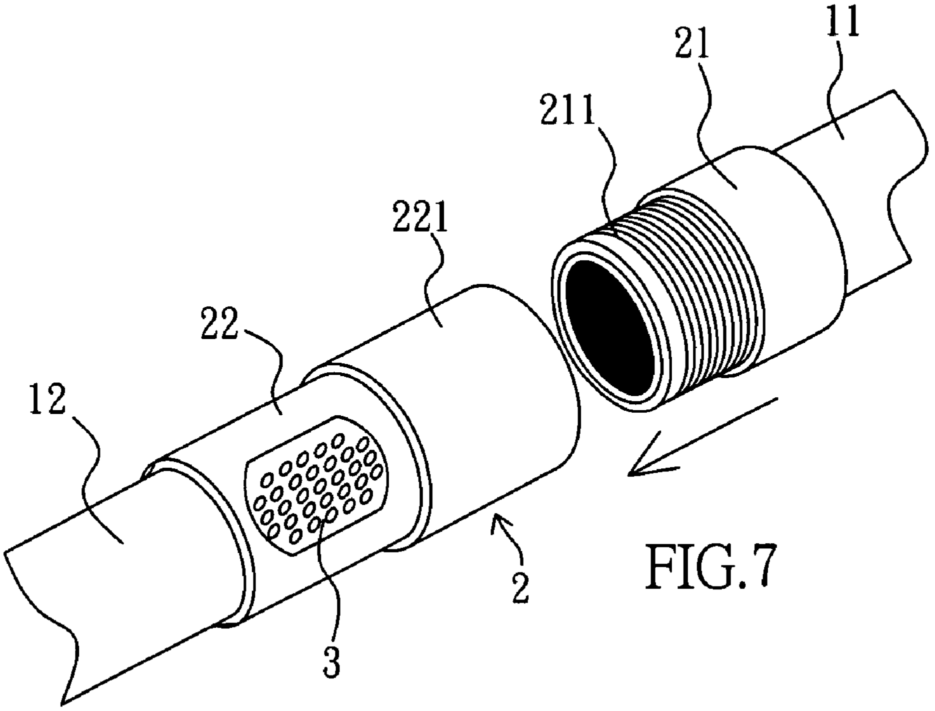
FIG. 7 is a perspective view illustrating the first joining part and the second joining part in the first embodiment of the present invention before engaging with each other.

Referring to FIG. 7, the engagement of the first joining member 21 to the second joining member 22 is similar to the conventional coaxial cable with the engagement of the male adapter to the female adapter. For instance, the first joining member 21 provides external screw threads 211 and the second joining member 22 has a turnable sleeve 221 with internal screw threads corresponding to the external screw threads 211. Hence, once the internal threads of the sleeve 221 engage with the external threads of the first joining member 21, the first joining member 21 is attached to the second joining member 22 firmly.

Figure 8:
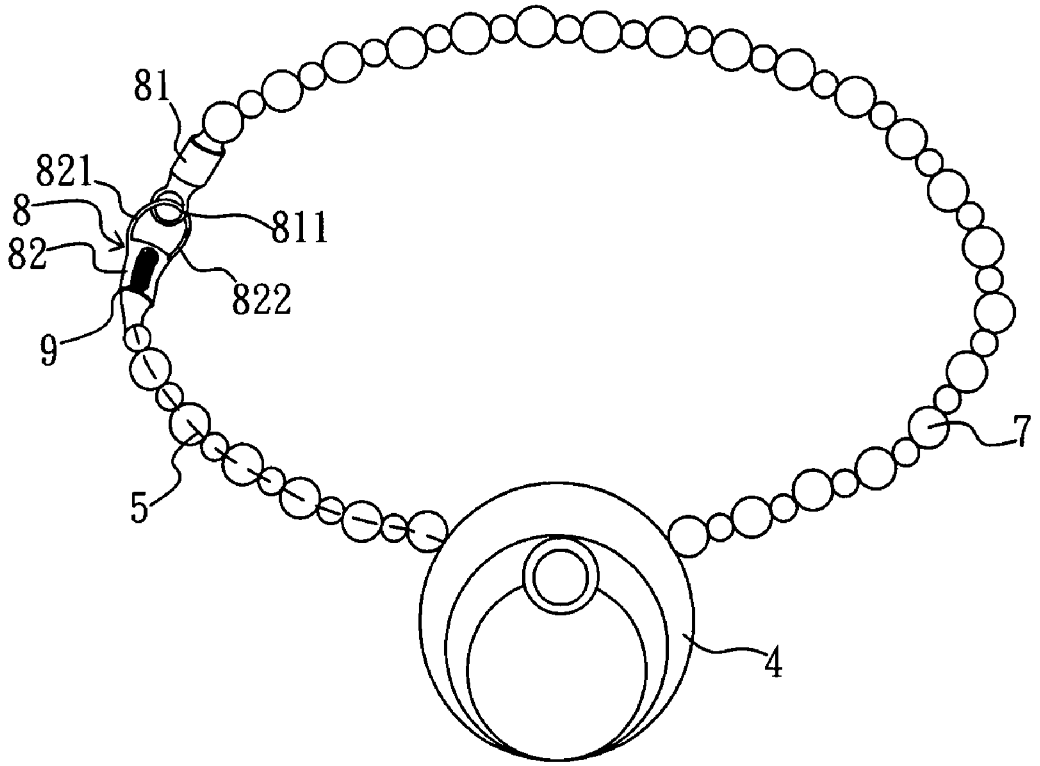
FIG. 8 is a perspective view the second embodiment of a decorative wireless earphone device according to the present invention.
Figure 9:
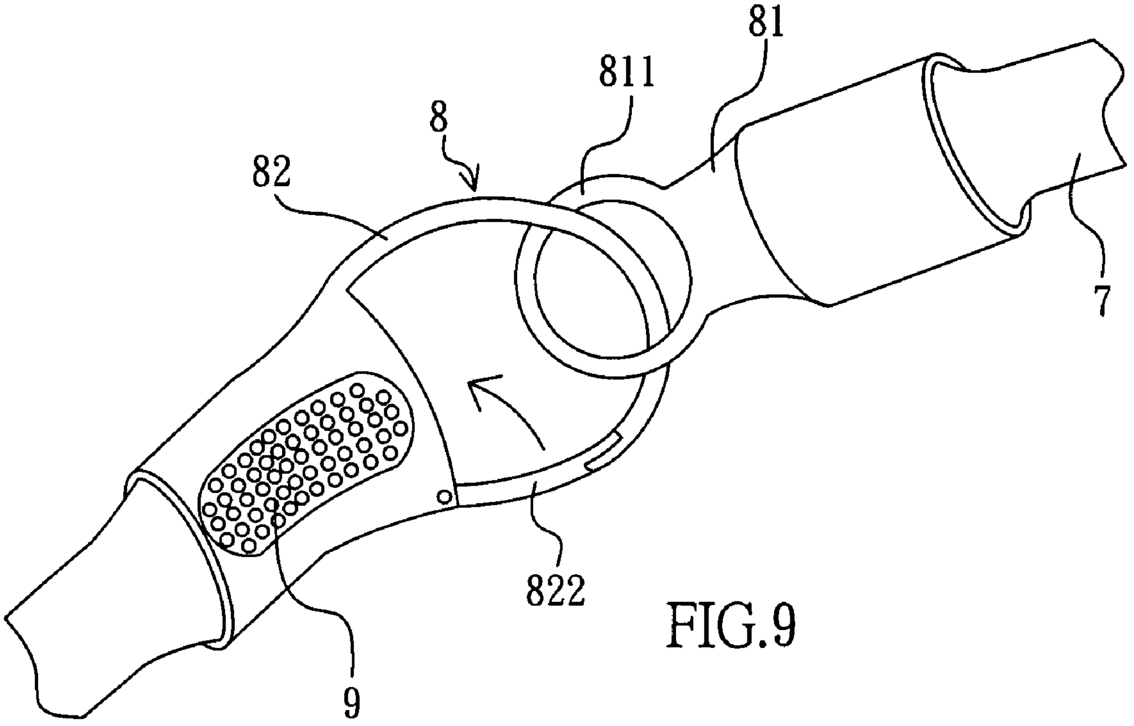
FIG. 9 is a perspective view illustrating the first joining part and the second joining part in the second embodiment of the present invention before engaging with each other.

Referring to FIGS. 8 and 9, the second embodiment of the decorative wireless earphone device according to the present invention includes a necklace 7, a joining set 8, a microphone 9, a main unit 4, an ear receiver and a lead wire 5. The differences of the second embodiment from the first embodiment is in that the necklace 7 is composed of a plurality of balls connecting with each other in series as a string and the first and second joining members 81, 82 are different from those used in the first embodiment. The first and second joining members 81, 82 have a first ring 811 and the second ring 821 respectively and the second ring 821 has a movable elastic member 822. When the user exerts a force to the movable end of the movable member 822, the second ring 821 creates a clearance for engaging with the first ring 811. In this way, the first and second rings 811, 821 can be joined to each other.

It is noted that the present invention has combined the second type Bluetooth earphone, which is earplug type earphone, and the fourth type Bluetooth earphone, which is hanging type, such that the wireless earphone device of the present invention has the advantages such as being portable easily and conveniently and overcome the deficiencies of the two types Bluetooth earphone. For instance, if the earplug type Bluetooth earphone is made lighter, thinner, shorter and smaller in order to improve portability and convenience thereof, the microphone with the receiver main unit becomes closer to the ear to affect quality of the received sound unfortunately. The earphone of the present invention is capable of allowing the earpiece being apart a distance from the microphone. In case of the earplug being inserted into the ear, the microphone moves near the mouth automatically to enhance function of the microphone. In addition, the microphone being close to the mouth provides better effect of sound receiving and convenience while in use.

It is appreciated that the decorative wireless earphone according to the present invention has overcome the deficiencies of the Bluetooth earphone being incapable of receiving sound easily although the Bluetooth earphone is made with small size. Further, the decorative wireless earphone of the present invention is loved by the female consumers due to the appearance of the earphone being ornamentally designed as a kind of precious article such that it could be hung on the neck naturally and reasonably and chance of being lost becomes less in addition to convenience and easy-storage. Hence, the decorative wireless earphone of the present invention has enhanced the value thereof additionally and competition of product is promoted substantively.

While the invention has been described with referencing to preferred embodiments thereof, it is to be understood that modifications or variations may be easily made without departing from the spirit of this invention, which is defined by the appended claims.

What is claimed is:

1. A decorative wireless earphone comprising:

a necklace;

a microphone being joined to the necklace for an user to output voice signal;

a main unit being joined to the necklace for receiving/sending radio signal and further comprising: an ornamental part, which provides a first surface and a second surface, and a earplug, which extends outward from the outer side of the second surface;

an earpiece being joined to the main unit and disposed in the earplug; and a lead wire being arranged in the necklace, an end thereof being connected to the main unit electrically and another end thereof being connected to microphone electrically;

wherein a distance between the microphone and the earpiece is almost equal to a distance between the mouth and the ear of human and the earplug hides behind the first surface.

2. The decorative wireless earphone as defined in claim 1, wherein the necklace provides a first end, which is joined to a first joining member, and a second end, which is joined to a second joining member.

3. The decorative wireless earphone as defined in claim 2, wherein the second surface provides a third joining member to engage with the necklace firmly.

4. The decorative wireless earphone as defined in claim 3, wherein the microphone is engaged to one of the first and second joining members.

5. The decorative wireless earphone as defined in claim 4, wherein the first joining member provides external screw threads and the second joining member provides a turnable sleeve with internal screw threads corresponding to the external screw threads.

6. The decorative wireless earphone as defined in claim 4, wherein the first joining member further provides a first ring and the second joining member further provides a second ring with an elastic movable member for restoring to a state of engagement.

7. The decorative wireless earphone as defined in claim 1, wherein the first surface of the main unit is made of jewelry material.

8. The decorative wireless earphone as defined in claim 7, wherein the wireless earphone is Bluetooth earphone.

9. The decorative wireless earphone as defined in claim 8, wherein the main unit provides keys available for adjusting volume and provides a switch key.

10. The decorative wireless earphone as defined in claim 9, wherein the main unit provides an indicating light.

11. The decorative wireless earphone as defined in claim 5, wherein the first surface of the main unit is made of jewelry material.

12. The decorative wireless earphone as defined in claim 11, wherein the wireless earphone is Bluetooth earphone.

13. The decorative wireless earphone as defined in claim 12, wherein the main unit provides keys available for adjusting volume and provides a switch key.

14. The decorative wireless earphone as defined in claim 13, wherein the main unit provides an indicating light.

15. The decorative wireless earphone as defined in claims 6, wherein the first surface of the main unit is made of jewelry material.

16. The decorative wireless earphone as defined in claim 15, wherein the wireless earphone is Bluetooth earphone.

17. The decorative wireless earphone as defined in claim 16, wherein the main unit provides keys available for adjusting volume and provides a switch key.

18. The decorative wireless earphone as defined in claim 17, wherein the main unit provides an indicating light.

* * * * *